United States Patent
Bunel et al.

(10) Patent No.: US 7,870,740 B2
(45) Date of Patent: Jan. 18, 2011

(54) TURBOJET ENGINE COMPRISING AN AFTERBURNER DUCT COOLED BY A VARIABLE-THROUGHPUT VENTILATION STREAM

(75) Inventors: Jacques Marcel Arthur Bunel, Fresnes (FR); Thierry Andre Emmanuel Cortes, Brunoy (FR); Alain Pierre Page, Montgeron (FR); Fabienne Vagner, Paris (FR)

(73) Assignee: SNECMA, Paris (FR)

( * ) Notice: Subject to any disclaimer, the term of this patent is extended or adjusted under 35 U.S.C. 154(b) by 935 days.

(21) Appl. No.: 11/741,400

(22) Filed: Apr. 27, 2007

(65) Prior Publication Data
US 2008/0110176 A1     May 15, 2008

(30) Foreign Application Priority Data
Apr. 28, 2006     (FR)     ................................ 06 51522

(51) Int. Cl.
*F02K 3/10*     (2006.01)
(52) U.S. Cl. .......................................... 60/766; 60/800
(58) Field of Classification Search ................. 60/761, 60/762, 766, 796, 799, 800
See application file for complete search history.

(56) References Cited

U.S. PATENT DOCUMENTS

| | | | | |
|---|---|---|---|---|
| 3,826,088 A | * | 7/1974 | Nash et al. | .................... 60/766 |
| 3,866,417 A | * | 2/1975 | Velegol | ....................... 60/766 |
| 5,131,222 A | | 7/1992 | Auxier et al. | |
| 5,209,059 A | | 5/1993 | Ward | |
| 6,418,709 B1 | * | 7/2002 | Narcus et al. | ................. 60/766 |
| 2005/0091964 A1 | | 5/2005 | Curtelin et al. | |

* cited by examiner

*Primary Examiner*—Louis Casaregola
(74) *Attorney, Agent, or Firm*—Oblon, Spivak, McClelland, Maier & Neustadt, L.L.P.

(57) ABSTRACT

An afterbody for a turbojet engine is disclosed. The afterbody includes an afterburner casing, a thermal protection liner, and a diaphragm-forming assembly interposed between the liner and the casing. The diaphragm-forming assembly defines a flow area which is traversed by a ventilation stream. The diaphragm-forming assembly includes two annular plates overlapping one another, each being perforated with a plurality of apertures and being mounted on the liner and the casing respectively. The apertures jointly define the flow area of the assembly. Furthermore, the assembly is designed such that the expansion of the liner causes an angular displacement of the plate with respect to the plate, leading to an increase in the size of the flow area.

8 Claims, 5 Drawing Sheets

TURBOJET ENGINE COMPRISING AN AFTERBURNER DUCT COOLED BY A VARIABLE-THROUGHPUT VENTILATION STREAM

BACKGROUND OF THE INVENTION

The present invention generally relates to an afterbody for an aircraft turbojet engine comprising an afterburner duct delimited by an afterburner casing, which is cooled by a ventilation stream circulating between this casing and a thermal protection liner.

The invention also relates to an aircraft turbojet engine comprising this afterbody, and to an aircraft comprising at least one such turbojet engine.

DESCRIPTION OF THE PRIOR ART

The prior art indeed discloses an afterbody section of a turbojet engine equipped with an annular ventilation duct defined between the afterburner casing and its multiperforated thermal protection liner, this annular duct thus being intended to be traversed by a ventilation stream which serves to cool the afterburner casing. By way of indication, the afterburner casing is liable to reach high temperatures of around 900° C. in the downstream section of this annular duct, particularly when the turbojet engine is operating in full-throttle mode with afterburning, and these temperatures can then drop to around 700° C. when the turbojet engine is operating in full-throttle dry mode, that is to say without afterburning.

A diaphragm is generally provided in the annular ventilation duct in order to obtain a ventilation stream having a given throughput, which is dependent on the flow area of this diaphragm. Customarily, this flow area is determined such that the flow of ventilation air coming from the secondary annular duct of the turbojet engine and passing through the ventilation/cooling duct allows satisfactory cooling of the afterburner casing under the most demanding conditions in terms of thermal stresses, namely when the turbojet engine is operating in full-throttle mode with afterburning.

Nevertheless, this implies that the throughput value of the afterburner casing ventilation stream is exaggeratedly high in the other operating modes of the turbojet engine, a situation which inevitably results in a lack of optimization in the management of the secondary fresh air leaving the secondary annular duct of this turbojet engine.

SUMMARY OF THE INVENTION

The main aim of the invention is therefore to provide an afterbody for an aircraft turbojet engine that rectifies the aforementioned problem relating to the prior art constructions.

To this end, the subject of the invention is an afterbody for an aircraft turbojet engine comprising an afterburner casing delimiting an afterburner duct, this afterbody also comprising a liner for the thermal protection of the afterburner casing that is arranged radially to the inside with respect to this casing, and this afterbody additionally including at least one diaphragm-forming assembly interposed between the thermal protection liner and the afterburner casing, this diaphragm-forming assembly defining a flow area intended to be traversed by a stream for ventilating the afterburner casing, and the thermal protection liner being mounted on the afterburner casing by way of fastening elements which are designed to impose a direction of angular displacement on this thermal protection liner with respect to the casing when the liner expands under the effect of thermal stresses. According to the invention, the diaphragm-forming assembly includes a first and second annular plate overlapping one another, each being perforated with a plurality of apertures and being mounted on the afterburner casing and the thermal protection liner respectively, the apertures in the two annular plates jointly defining the flow area. Furthermore, the diaphragm-forming assembly is designed such that the expansion of the thermal protection liner under the effect of thermal stresses causes a displacement of the second annular plate in the direction of angular displacement with respect to the first annular plate, leading to an increase in the size of the flow area defined by the apertures.

Hence, the invention advantageously affords a diaphragm-forming assembly with variable permeability, thus allowing the throughput value of the afterburner casing ventilation stream to be adapted automatically to suit the temperature level prevailing within the afterbody section of the turbojet engine, since this temperature level has a direct bearing on the level of thermal expansion of the thermal protection liner which bears the second annular plate of the diaphragm-forming assembly.

It should be understood that this diaphragm-forming assembly allows a higher throughput to flow through when the level of thermal expansion of the thermal protection liner increases, this advantageously being completely consistent with the need to cool the afterburner casing more intensely when the temperatures within the afterbody of the turbojet engine are high.

The principle of the invention is therefore based on securing the second annular plate to the thermal protection liner, making it possible for this plate to follow the considerable thermal deformations of the liner, and thus for these deformations to be used so as to obtain a modification of the relative position between the two plates, obviously with the aim of tailoring the size of the flow area to the desired throughput value. Of course, the dimensioning of the elements constituting the diaphragm-forming assembly, and particularly the geometry of the apertures, is achieved by carrying out tests for determining the angular thermal displacement of the protection liner dependent on the level of temperature in the afterbody. Furthermore, to ensure that the ventilation stream throughput obtained is as close as possible to that desired, the thermal expansion experienced by the afterburner casing bearing the first annular plate of the assembly can also be taken into account, even though this expansion appears negligible compared with that encountered by the liner, which is exposed to higher temperatures given its closer position to the center of the afterburner duct and given its function as thermal shield with respect to this same casing.

An additional advantage specific to the present invention lies in the fact that the driving element for the rotation of the second annular plate in the direction of angular displacement is constituted by the expansion of the thermal protection liner, which means that it is advantageously not necessary to provide an additional actuator to control the size of the flow area of the diaphragm-forming assembly, since the operation is based on the physical properties of thermal expansion of the protection liner. Of course, the aim here is to achieve an extremely satisfactory reliability for the diaphragm-forming assembly.

As has been mentioned above, the invention proposed makes it possible to tailor the throughput value to the mode of the turbojet engine, it being obvious that the ventilation stream throughput will be higher in full-throttle mode with afterburning, which produces very high temperatures within the afterbody, than in full-throttle dry mode where the temperatures reached by the liner and the afterburner casing are significantly lower.

In this respect, the variable size of the flow area, which calibrates the ventilation stream throughput and is defined jointly by the apertures in the two annular plates, is therefore determined according to the relative position of the annular plates with respect to one another, which relative position will thus imply a greater or lesser coincidence between the apertures in one of the plates and the apertures in the other of the two annular plates. It goes without saying that the greater the overlapping between the apertures, the larger the flow area of the diaphragm-forming assembly.

When the diaphragm-forming assembly adopts a position affording a ventilation stream throughput below a maximum throughput, the secondary air not used to form this throughput can then advantageously be employed to supply other afterbody sections of the turbojet engine, and in particular be used to improve afterburning performance by helping achieve better merging of the primary and secondary streams which come together in the afterbody.

Preferably, the fastening elements are likewise designed to allow an outward radial displacement of the thermal protection liner with respect to the casing when the liner expands under the effect of thermal stresses. In such a case, the diaphragm-forming assembly is then designed such that the expansion of the thermal protection liner under the effect of thermal stresses also causes an outward radial displacement of the second annular plate with respect to the first annular plate, leading to an increase in the size of the flow area defined by the apertures.

Thus, the increase in the flow area of the diaphragm-forming assembly resulting from the thermal expansion of the protection liner is brought about not only by increasing overlapping of the apertures in the circumferential direction of the plates, but also by increasing overlapping of the apertures in the outward radial direction. In any event, it is recalled that the two movements of the second plate in the directions indicated above are caused by the thermal expansion of the thermal protection liner, which expansion thus constitutes the driving element of the diaphragm-forming assembly.

Preferably, the two annular plates are in contact with one another and arranged in a longitudinal direction of said turbojet engine. However, it would nevertheless be possible to provide a slight clearance/gap between these two oppositely arranged plates without departing from the scope of the invention, with the proviso that this clearance/gap is sufficiently small so as not to adversely affect the operation of the diaphragm-forming assembly whereby the flow area thereof is defined by those portions of the apertures in the plates which are not blocked off by the solid portion of these plates when the latter are viewed in the direction in which the ventilation stream propagates, namely in the longitudinal direction of the turbojet engine, which also corresponds to the direction orthogonal to the annular plates. Furthermore, it is also possible to provide a clearance in the cold state between these two plates and to provide that they come into contact in the hot state as a result of an axial differential expansion between the thermal protection liner and the afterburner casing. Nevertheless, since the axial thermal expansion of these elements is extremely low, it is in fact preferred to provide a permanent contact between the first and second annular plate of the diaphragm-forming assembly.

Preferably, these two annular plates are arranged concentrically about a longitudinal axis of the turbojet engine.

Preferably again, the first annular plate has a first network of apertures which is identical to a second network of apertures made in the second annular plate, the apertures of the first network cooperating in pairs with the apertures of the second network with an at least partial overlap. Furthermore, in the cold state, each aperture of the first network is offset radially outwardly and angularly in the direction of angular displacement with respect to its associated aperture of the second network. Thus, it is clear that once the thermal protection liner is subjected to substantial thermal stresses, the latter by expanding will cause the second annular plate to move in said direction of angular displacement and in the outer radial direction, which will thus result in an increase in the extent of the mutual overlapping between the first and second apertures, and hence in an increase in the size of the flow area of the assembly.

Preferably, the diaphragm-forming assembly is designed in such a way that it can be positioned, dependent on a level of thermal expansion of the thermal protection liner, between a minimum throughput position in which the flow area of minimum size is obtained by the apertures in one of the two annular plates being partially overlapped by the other of the two annular plates, and vice versa, and a maximum throughput position in which the flow area of maximum size corresponds to all the apertures in one of the two annular plates. Furthermore, in the preferred, although non-limiting, case where the network of apertures provided in each of the two plates is identical, the flow area of the assembly in the maximum throughput position then corresponds to the identical flow area defined independently by each of the two plates with its own network of apertures, insofar as a perfect coincidence is sought between the apertures in the two annular plates. Thus, in this preferred case and in the maximum throughput position, the apertures in one of the two annular plates are not at all covered/blocked off by the other of the two annular plates, and vice versa.

Moreover, another subject of the invention is an aircraft turbojet engine comprising such an afterbody.

Finally, another subject of the invention is an aircraft comprising at least one such turbojet engine.

Other advantages and features of the invention will become apparent from the non-limiting detailed description below.

BRIEF DESCRIPTION OF THE DRAWINGS

This description will be given with reference to the appended drawings, in which.

DETAILED DESCRIPTION OF THE PREFERRED EMBODIMENTS

Figure 1:
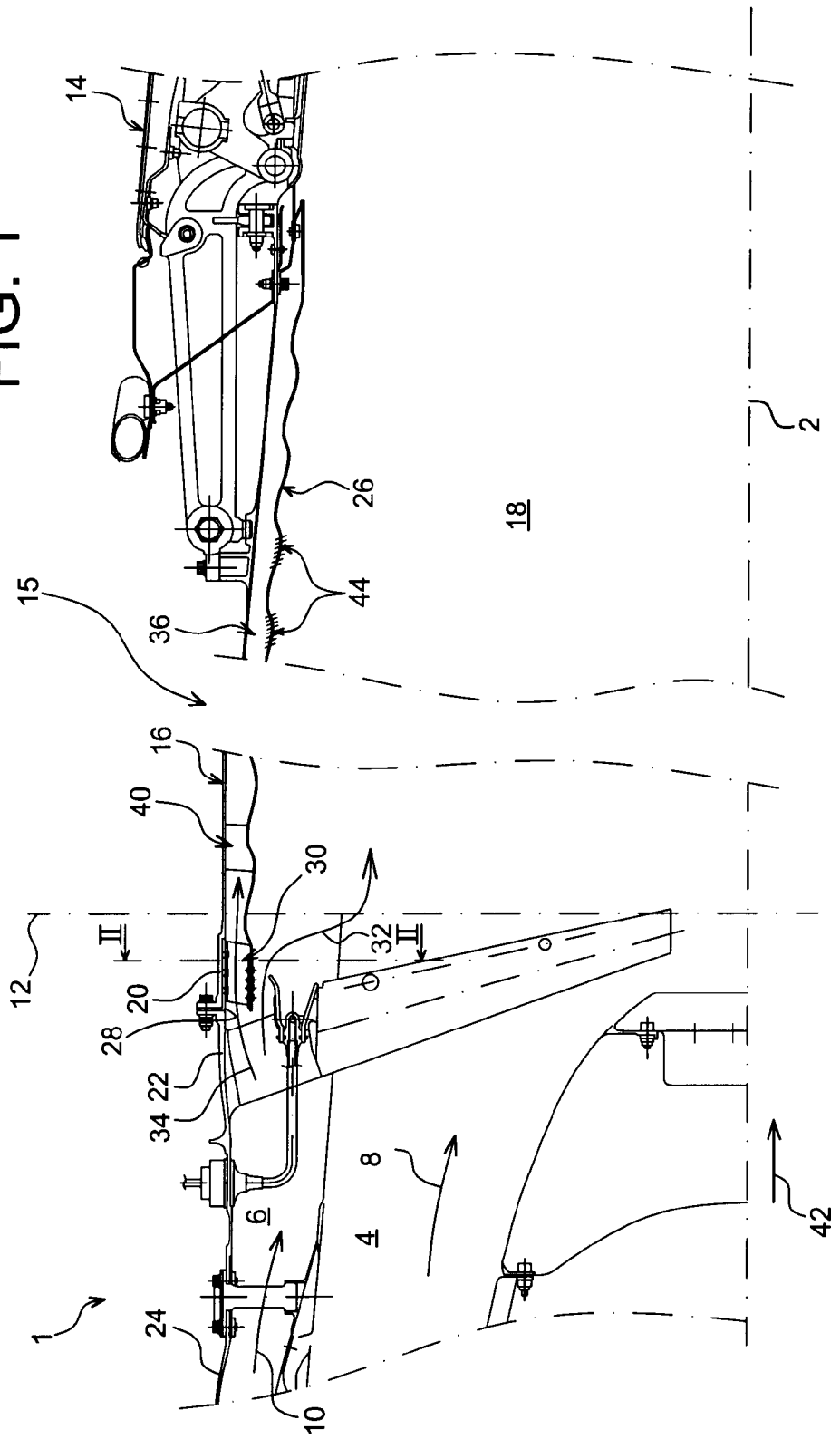
FIG. 1 represents a view in longitudinal section of a rear section of a turbojet engine according to a preferred embodiment of the present invention.

With reference first of all to FIG. 1, there can be seen a rear section of a turbojet engine 1 for an aircraft, according to a preferred embodiment of the present invention.

This FIG. 1 thus shows the rear section of the turbojet engine 1 extending along its longitudinal axis 2, this rear section also being known by the term "afterbody" by a person skilled in the art.

In an upstream section of this afterbody the turbojet engine 1 has a primary duct, referenced 4, surrounded by a secondary annular duct 6, these ducts 4, 6 being respectively traversed by a primary stream 8 and a secondary stream 10 composed essentially of fresh air. The primary 8 and secondary 10 streams are intended to be mixed at a more rearward section of the turbojet engine, this section being referred to as the afterburner section and being situated wholly downstream with respect to the imaginary plane 12 shown schematically in FIG. 1. In this respect, it is indicated that the aforementioned mixing takes place by means of mixer arms which are attached to an outer casing 24 of the turbojet engine and extend radially inward from the latter, as is clearly shown in FIG. 1. This figure shows that the mixer arms (not referenced) intercept the imaginary transverse plane 12.

It is noted that the afterburner section, constituting the most downstream section of the engine and being terminated by nozzle flaps 14, includes an afterburner casing 16 delimiting an afterburner duct 18 centered on the axis 2 of the turbojet engine. By way of indication, this casing 16 is mounted on the outer casing 24 of the secondary annular duct 6 by means of a fastening flange 20, which is thus attached fixedly to a fastening flange 22 situated upstream thereof that extends said outer casing 24 of the secondary annular duct 6 in the downstream direction. Furthermore, the fastening flange 20 extends the afterburner casing 16 in the upstream direction, as shown in FIG. 1.

To cool this afterburner casing 16, a thermal protection liner 26 is placed along the axis 2 such that the liner 26 and the casing 16 jointly form an annular duct for cooling this casing, as is known to a person skilled in the art. Thus, the thermal protection liner 26 extends in the upstream to downstream direction from the fastening flange 20 to close to the nozzle flaps 14, as is clearly visible in FIG. 1. This thermal protection liner 26, which is thus attached radially inwardly with respect to the afterburner casing 16, is fastened to this same casing 16 by means of an intermediate fastening flange 28 arranged between the two aforementioned flanges 20, 22. Specifically, the thermal protection liner is provided at its upstream end with a plurality of fastening elements 30 attached fixedly thereto and also to this same intermediate fastening flange 28. By way of indication, these fastening elements may be ones of the Z-bridge type which through their design make it possible to accompany the thermal protection liner in its movement as encountered following a considerable thermal expansion that draws said liner substantially closer to the afterburner casing 16, as will be explained in more detail with reference to FIGS. 2a and 2b. As is known to a person skilled in the art, these fastening elements 30 are arranged uniformly all around the axis 2, between this protection liner 26 and the intermediate circular flange 28 of which the portion fastening the elements 30 is situated radially inwardly with respect to the fastening flange 20 of the afterburner casing 16.

Thus, the secondary fresh air stream 10 leaving the secondary annular duct 6 is separated into two distinct streams, including a fresh air stream 32 which enters within the afterburner duct 18 so as to be mixed therein with the primary air stream 8, and also a ventilation stream 34 which enters within the annular cooling duct 36 and serves to cool the casing 16, as has been mentioned above. The two streams 32, 34 originating from the same secondary fresh air stream 10 are distributed by virtue of the presence of at least one diaphragm-forming assembly 40 situated within the annular cooling duct 36, and preferably in an upstream portion thereof, that is to say in the vicinity of the fastening elements 30. In this regard, it is noted that in the preferred embodiment described, only one diaphragm-forming assembly 40 is provided within the annular cooling duct 36. Nevertheless, it would be possible to provide a number of them spaced apart in the longitudinal direction of the turbojet engine, referenced by the arrow 42, and parallel to the axis 2, depending on the requirements which arise.

In such a case, if the diaphragm-forming assembly 40 situated the furthest upstream defines the overall ventilation stream throughput passing through the annular cooling duct 36, it is noted that those situated further downstream may, for example, be arranged as a function of the thermal protection air film which is sought to be achieved in the region of the internal wall of the protection liner 26, which film is permitted owing to the presence of multiperforations 44 made in this same liner 26, preferably in the region of the innermost radial portions, as is shown in FIG. 1.

Figure 2A:
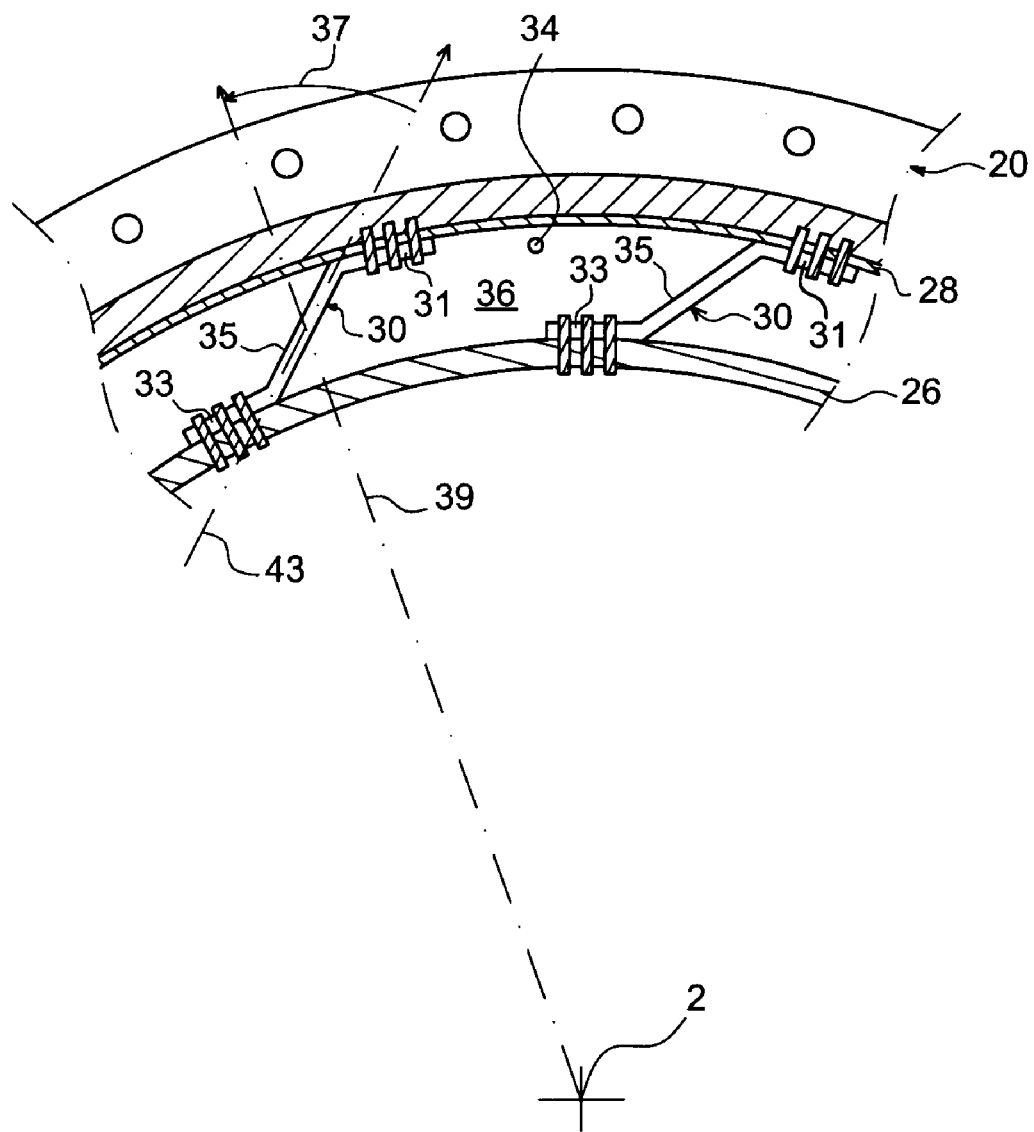
FIG. 2a represents a partial view in section taken on the line II-II of FIG. 1 when the thermal protection liner of the turbojet engine is subjected to a minimum level of thermal stresses.
Figure 2B:
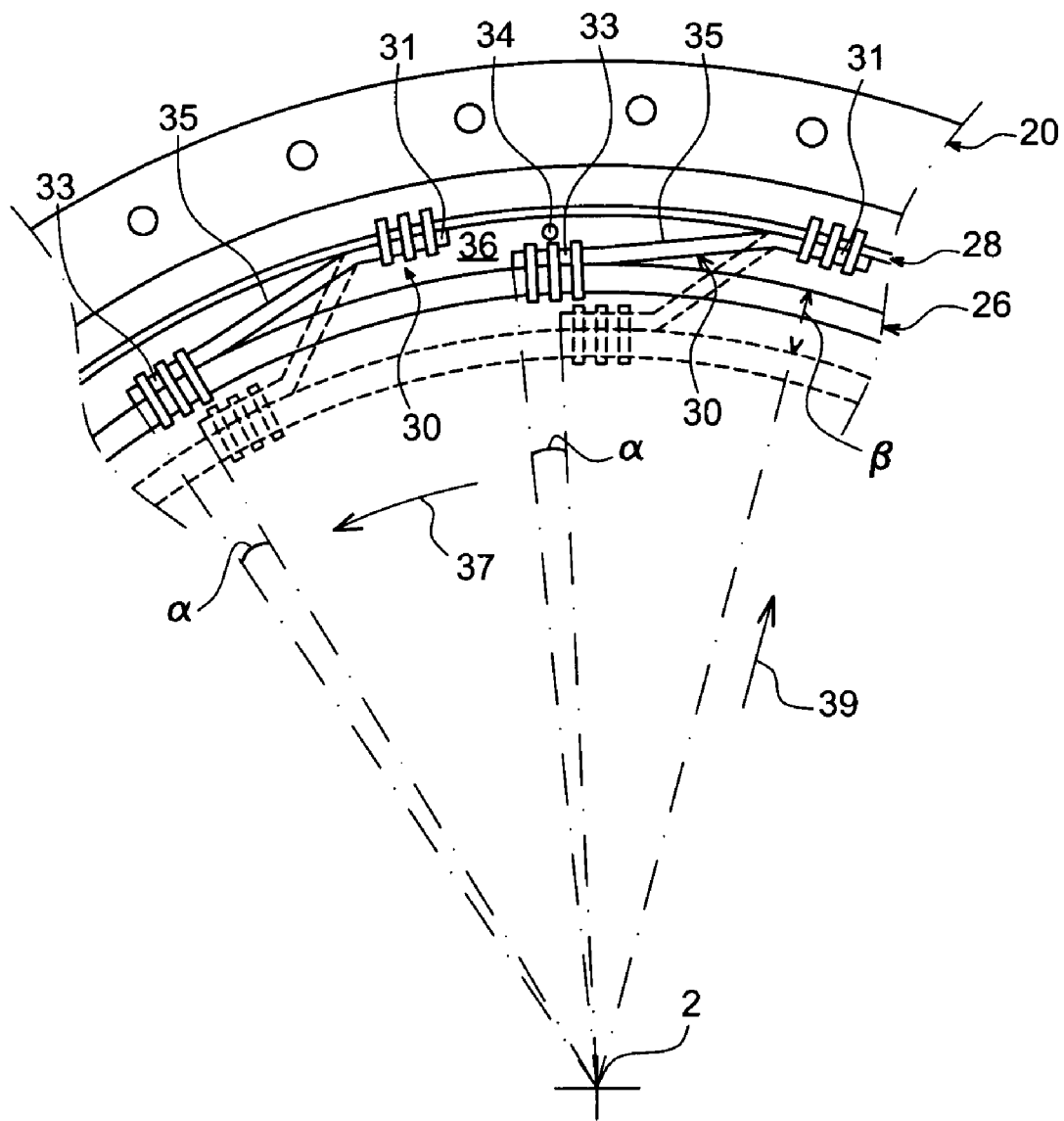
FIG. 2b represents a partial view in section taken on the line II-II of FIG. 1 when the thermal protection liner of the turbojet engine is subjected to a maximum level of thermal stresses.

With reference therefore to FIGS. 2a and 2b, it is possible to see more precisely the fastening elements 30 which establish the mechanical joint between the liner 26 and the afterburner casing, more specifically its fastening flange 20.

Overall, these elements 30, which are preferably identical, have a design allowing the thermal protection liner 26, when it expands under the effect of thermal stresses emanating from the heat from the afterburner duct 18, to be displaced radially outward in the direction of the afterburner casing, which for its part experiences a thermal displacement in the same direction but which is relatively negligible by comparison with that associated with the liner. Furthermore, during this radial thermal displacement of the liner with respect to the casing, the liner also experiences an angular displacement with respect to this same casing, substantially about the axis 2 and in a direction 37 of angular displacement imposed by the design of the fastening elements 30.

More specifically, each fastening element 30 includes an afterburner casing fastening tab 31 mounted fixedly on the flange 28, a liner fastening tab 33 mounted fixedly on the liner, and a junction tab 35 connecting the two aforementioned fastening tabs 31, 33. Thus, dependent on the inclination of the junction tab 35 with respect to an outward radial direction 39 of the turbojet engine, the direction 37 of angular displacement will be imposed on the liner 26 during the thermal expansion thereof.

In the preferred embodiment shown in FIGS. 2a and 2b, it can be seen that the junction tab 35 of the fastening elements 30 is arranged so as to extend wholly in an outward main direction 43, that is to say starting from its lower end toward its upper end. As can be seen in FIG. 2a, the outward radial direction 39 passing through this junction tab 35 is offset by an acute angle in the counterclockwise direction with respect to this main direction 43. In other words, the passage from the direction 43 to the direction 39, both oriented in the above-mentioned manner, occurs through an acute angle in the counterclockwise direction. It is thus precisely this counterclockwise direction defined by the angular offset between the directions 39, 43 that imposes said direction 37 of angular displacement on the liner 26 when it expands.

Therefore, when passing from a state in which the thermal protection liner is subjected to a minimum level of thermal stresses as represented in FIG. 2a, implying an appreciable radial spacing between the liner and the casing, to a state in which the thermal protection liner is subjected to a maximum level of thermal stresses as represented in FIG. 2b, it can be seen from the broken lines represented in this latter figure that the liner 26 is not only displaced in the outer radial direction 39 with respect to the afterburner casing, but is also displaced with respect to this same casing in the circumferential direction in the direction 37 of angular displacement 37. Nevertheless, it is noted that the uniform distribution of the fastening elements 30 around the axis 2 implies that the liner 26 retains its centering on this same longitudinal axis 2 of the turbojet engine whatever the level of thermal stresses applied to it.

By way of indication, the angular displacement of the liner 26 in the direction 37 is represented by the reference α in FIG. 2b, whereas its radial displacement in the direction 39 is represented by the reference β in this same FIG. 2b. In this regard, it is recalled that the afterburner casing can also experience a radial displacement in the direction 39 during its thermal expansion, which displacement has not been represented for reasons of clarity, and which usually remains negligible with respect to that of the liner 26.

In addition, it is indicated that the ratio between the radial and angular displacements experienced by the liner during its thermal expansion is conditioned by the initial length and inclination, that is to say the cold state, of the junction tab 35, which a person skilled in the art may thus set according to the requirements which arise.

Since the diaphragm-forming assembly 40 is specific to the present invention, it will now be described in detail with reference to FIGS. 3 to 6b.

Figure 3:
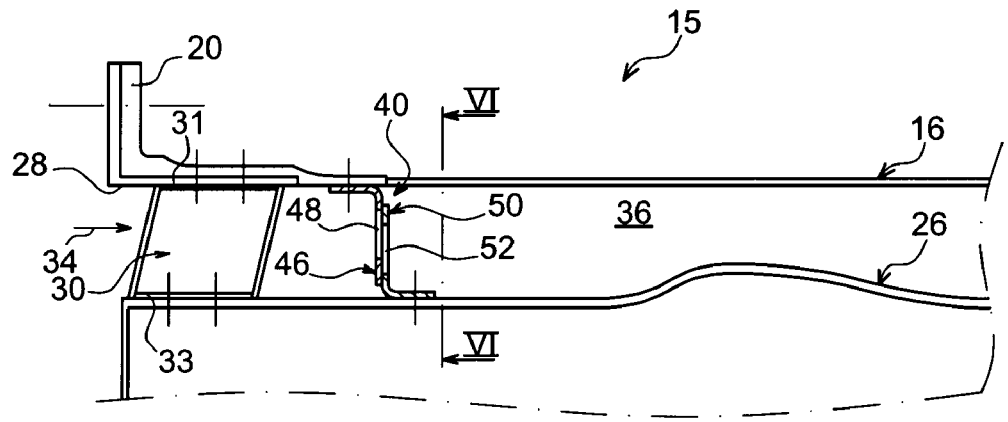
FIG. 3 represents a detailed view of a portion of the view shown in FIG. 1, in which the diaphragm-forming assembly equipping the afterburner casing can be seen.

With reference first of all to FIG. 3, it can be seen that the diaphragm-forming assembly 40 primarily includes a first annular plate 46 perforated with a plurality of apertures 48, and a second plate 50 perforated for its part with a plurality of apertures 52. More specifically, the first annular plate, centered on the longitudinal axis of the turbojet engine 1, is mounted fixedly on the afterburner casing 16, its internal radial section incorporating the apertures 48 projecting inside the annular cooling duct 36. Thus, this first annular plate 46, situated the furthest upstream, has a first network of apertures 48 through which the ventilation stream 34 must necessarily cross so that it can continue its journey toward the downstream direction of the turbojet engine 1.

On the other hand, the second perforated plate 50 is for its part mounted fixedly on the thermal protection liner 26, its internal radial section including apertures 52 projecting inside the annular cooling duct 36. The two plates 46, 50, which are in contact with one another but which could, if appropriate, be separated with a small clearance, can thus be displaced relatively with respect to one another in rotation about the axis 2 and radially, as will be explained below.

Furthermore, it is noted that the ventilation stream 34 must therefore also cross the second network of apertures 52 so that it can continue its route in the downstream direction.

Figure 4:
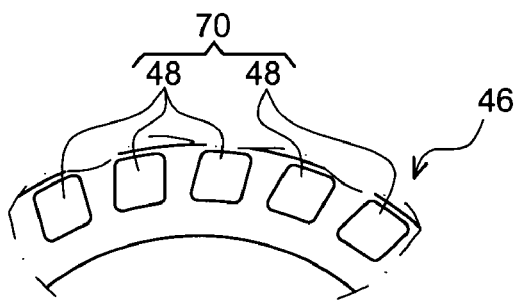
FIG. 4 represents a partial view of the first annular plate belonging to the diaphragm-forming assembly shown in FIG. 3.

With reference now to FIG. 4, there can be seen a section of the first annular plate 46 equipped with the plurality of apertures 48, jointly forming the first network of apertures 70. As is visible from FIG. 4, the apertures 48 are distributed angularly in a uniform manner around the axis of the turbojet engine, and preferably all have the same geometry, that is to say the same shape and the same dimensions. In this respect, these apertures passing through the plate 46 may all take the shape of a square, a rectangle or a parallelogram with rounded edges. Of course, other shapes can also be contemplated for these apertures 48, without departing from the scope of the invention.

Figure 5:
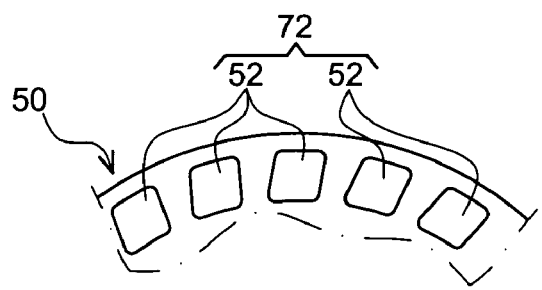
FIG. 5 represents a partial view of the second annular plate belonging to the diaphragm-forming assembly shown in FIG. 3.

With reference to FIG. 5, it can be seen that the second annular plate 50 has a second network 72 of apertures 52 which is identical to the first network formed on the first annular plate 46. This means that, in this preferred embodiment, the number, shape and dimensions of the apertures 48, 52 are identical such that, by judicially positioning the two plates 46, 50 with respect to one another, it is possible to obtain perfect paired coincidence between the first apertures 48 and the second apertures 52, as will be explained below.

One of the main distinguishing features of the present invention lies in the fact that the diaphragm-forming assembly 40 defines, by means of the first and second apertures 48, 52, a flow area whose size quite clearly determines the magnitude of the ventilation stream throughput 34 flowing through the annular cooling duct 36. As is clearly apparent from the foregoing, the flow area of the assembly 40 consists solely of the superposed regions of the apertures 48, 52, viewed in the direction of the longitudinal axis 2, as can be seen in FIG. 6a.

Figure 6A:
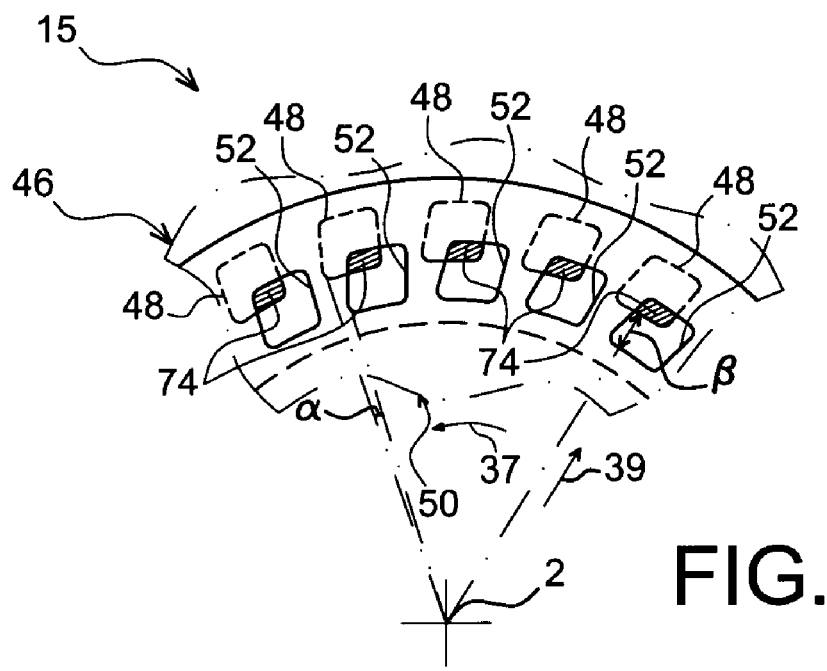
FIG. 6a represents a view in section taken on the line VI-VI of FIG. 3 when the diaphragm-forming assembly is in a minimum throughput position adopted automatically when the thermal protection liner of the turbojet engine is subjected to said minimum level of thermal stresses.

In this regard, it is noted that in FIG. 6a the diaphragm-forming assembly 40 is shown in a minimum throughput position in which the flow area of minimum size is obtained by the apertures 48 being partially overlapped by the plate 50 and by the apertures 52 being partially overlapped by the plate 46. Accordingly, the flow area, referenced 74, consists of those portions of the apertures 48, 52 which are not blocked off by the other plate, as is schematically represented by the hatched regions of FIG. 6a depicting the flow area of the assembly 40. In other words, it must be considered that the flow area 74 corresponds exclusively to the regions of mutual overlap between the apertures 48 in the first plate 46 and the apertures 52 in the second plate 50. Of course, when the relative position of the two plates is intended to provide a minimum throughput of the ventilation stream 34, the flow area 74 is thus less than a flow area associated with each of the two plates 46, 50 and defined by its own apertures 48, 52.

This position of the assembly 40 also corresponds to a state in which the protection liner is subjected to a minimum level of thermal stresses, as mentioned above with reference to FIG. 2a.

Thus, it can be seen that in this low-throughput configuration, which is identical to or similar to that encountered in the cold state, each aperture 48 of the first network 70 is offset with respect to its associated aperture 52 belonging to the second network 72, radially outwardly in the direction 39 by the value β, and angularly in the direction 37 of angular displacement by the value α.

In this preferred embodiment, provision is made to allow the diaphragm-forming assembly 40 to be brought automatically into a maximum throughput position in which the flow area 74 of maximum size then corresponds to all the apertures 48, 52 in either one of the two plates 50, 48. In fact, provision is made for the second plate 50 secured to the liner 26 to be caused to move in the direction 37 of angular displacement and in the outer radial direction 39 as a simple result of the thermal expansion experienced by the liner, which expansion thus constitutes the element driving the assembly 40.

During such an expansion, the liner 26 is displaced under the effect of thermal stresses emanating from the afterburner duct 18, taking the second plate 50 along with it in the direction 37 of angular displacement and in the outer radial direction 39. This consequently results in a progressive enlargement of the region of mutual overlap between the apertures 48, 52 so as to achieve complete coincidence as shown in FIG. 6b, therefore making it possible to obtain a flow area 74 with a size identical to the size of the flow area associated with each of the two plates 46, 50.

By way of indication, it is pointed out that when it would in fact be intended to obtain complete coincidence between the apertures 48, 52 in a maximum throughput position, without neglecting the radial thermal expansion of the afterburner casing, the initial radial spacing shown in FIG. 6a between the apertures 48 and 52 should then of course be set to a value slightly below the value β of the radial thermal displacement of the liner, schematically represented in FIG. 2b, between the two positions of minimum throughput and maximum throughput.

Figure 6B:
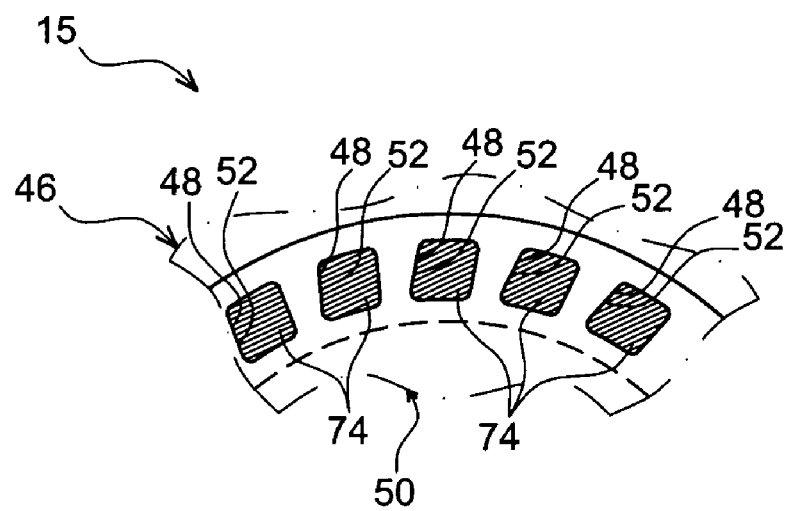
FIG. 6b represents a view in section taken on the line VI-VI of FIG. 3 when the diaphragm-forming assembly is in a maximum throughput position adopted automatically when the thermal protection liner of the turbojet engine is subjected to said maximum level of thermal stresses.

The diaphragm-forming assembly 40 can then be brought automatically, dependent on the level of thermal stresses applied to the liner 26, and thus dependent on the level of thermal expansion of this same liner, into any intermediate position between the positions of maximum throughput and minimum throughput represented in FIGS. 6a and 6b, corresponding respectively to a position in which the apertures 48, 52 only very partially overlap one another in pairs, and to a position in which the apertures 48, 52 overlap one another perfectly in pairs, as shown by the hatched regions in FIG. 6b depicting the flow area 74 of the diaphragm-forming assembly 40.

Furthermore, it is indicated that the invention is of course focused on the turbojet engine 1, but that another subject of the invention concerns the afterbody for an aircraft turbojet engine referenced by the general reference number 15 in the figures. In this regard, it is noted that this afterbody likewise extends in the longitudinal direction 42, being centered on the longitudinal axis 2.

Of course, various modifications may be made by a person skilled in the art to the invention which has just been described purely by way of non-limiting example.

The invention claimed is:

1. An afterbody for an aircraft turbojet engine comprising:
   an afterburner casing delimiting an afterburner duct;
   a liner for the thermal protection of the afterburner casing that is arranged radially to the inside with respect to this casing; and
   at least one diaphragm-forming assembly interposed between said thermal protection liner and said afterburner casing, the diaphragm-forming assembly defining a flow area which is traversed by a stream which ventilates the afterburner casing,
   wherein said thermal protection liner is mounted on said afterburner casing by fastening elements which impose an angular displacement on the thermal protection liner in a circumferential direction with respect to said casing when said liner expands under the effect of thermal stresses,
   wherein said diaphragm-forming assembly includes a first annular plate and a second annular plate which overlap each other, each of the first annular plate and the second annular plate is perforated with a plurality of apertures and is mounted on said afterburner casing and said thermal protection liner respectively, said apertures in the two annular plates jointly define said flow area, and
   wherein said diaphragm-forming assembly is designed such that the expansion of the thermal protection liner under the effect of thermal stresses causes a displacement of said second annular plate in said direction of angular displacement with respect to said first annular plate, leading to an increase in the size of said flow area defined by the apertures.

2. The afterbody as claimed in claim 1, wherein said fastening elements to allow an outward radial displacement of said thermal protection liner with respect to said casing when said liner expands under the effect of thermal stresses, and
   wherein said diaphragm-forming assembly is designed such that the expansion of the thermal protection liner under the effect of thermal stresses also causes an outward radial displacement of said second annular plate with respect to said first annular plate, leading to an increase in the size of said flow area defined by the apertures.

3. The afterbody as claimed in claim 1, wherein said two annular plates are in contact with one another and arranged in a longitudinal direction of said turbojet engine.

4. The afterbody as claimed in claim 1, wherein said two annular plates are arranged concentrically about a longitudinal axis of said turbojet engine.

5. The afterbody as claimed in claim 1, wherein said first annular plate includes a first network of apertures which is identical to a second network of apertures provided in said second annular plate, said apertures of the first network cooperating in pairs with said apertures of said second network with an at least partial overlap, and
   wherein, in a cold state, each aperture of the first network is offset radially outwardly and angularly in said direction of angular displacement with respect to its associated aperture of the second network.

6. The afterbody as claimed in claim 1, wherein said diaphragm-forming assembly is positioned, dependent on a level of thermal expansion of said thermal protection liner, between a minimum throughput position in which the flow area of minimum size is obtained by the apertures in one of the two annular plates being partially overlapped by the other of the two annular plates, and vice versa, and a maximum throughput position in which the flow area of maximum size corresponds to all the apertures in one of the two annular plates.

7. An aircraft turbojet engine comprising an afterbody as claimed in claim 1.

8. An aircraft comprising at least one turbojet engine as claimed in claim 7.

* * * * *

UNITED STATES PATENT AND TRADEMARK OFFICE
CERTIFICATE OF CORRECTION

| | | |
|---|---|---|
| PATENT NO. | : 7,870,740 B2 | Page 1 of 1 |
| APPLICATION NO. | : 11/741400 | |
| DATED | : January 18, 2011 | |
| INVENTOR(S) | : Jacques Marcel Arthur Bunel et al. | |

It is certified that error appears in the above-identified patent and that said Letters Patent is hereby corrected as shown below:

Column 10, line 16, delete "to" before "allow."

Signed and Sealed this
Fifth Day of April, 2011

David J. Kappos
*Director of the United States Patent and Trademark Office*